United States Patent [19]

Kelly

[11] 4,444,587

[45] Apr. 24, 1984

[54] BRAZING ALLOY

[75] Inventor: Thomas J. Kelly, Suffern, N.Y.

[73] Assignee: Huntington Alloys, Inc., Huntington, W. Va.

[21] Appl. No.: 462,781

[22] Filed: Feb. 3, 1983

[51] Int. Cl.$^3$ .............................................. C22C 38/06
[52] U.S. Cl. .................................. 75/124; 75/128 A; 75/128 B; 420/584; 219/85 H; 228/263.11
[58] Field of Search ............. 75/124 F, 124 C, 128 A, 75/126 B, 128 C, 126 Q, 126 P, 128 F; 420/584, 583; 219/85 H, 146.23, 146.41; 228/263.16, 263.11, 263,14

[56] References Cited

U.S. PATENT DOCUMENTS 1,762,483  10/1925  Norwood .......................... 75/126 Q
3,352,666  11/1967  Foster et al. ...................... 75/128 F

FOREIGN PATENT DOCUMENTS 54-128420  10/1979  Japan ................................. 75/124 F
56-96058   8/1981   Japan .................................. 420/584
57-79153   5/1982   Japan ................................ 75/128 C
183042    12/1966   U.S.S.R. ............................ 75/126 P

*Primary Examiner*—L. Dewayne Rutledge
*Assistant Examiner*—Debbie Yee
*Attorney, Agent, or Firm*—Edward A. Steen; Raymond J. Kenny

[57] ABSTRACT

An iron-based brazing alloy suitable for brazing iron-based alloys subject to high temperature environments. The resulting brazement contains little or no undesirable chromium boride (CrB) phase. Manganese, substituted for boron, depresses the melting point of the brazing alloy and vaporizes during the brazing cycle. This vaporization, by adjusting the relative proportions of the remaining elements, raises the remelt temperature of the brazement.

3 Claims, No Drawings

BRAZING ALLOY

TECHNICAL FIELD

This invention relates to brazing in general, and more particularly, to an iron-based brazing alloy especially useful for iron-based alloy systems exposed to high temperatures.

BACKGROUND ART

Until recently no truly iron-based alloys were used for high strength, long-term applications above 871° C. (1600° F.). However, the relatively new iron-based ODS (oxide-dispersion-strengthened) alloy INCOLOY alloy MA 956 can be used up to 1204° C. (2200° F.). (INCOLOY is a trademark of the Inco family of companies.) Since all previous alloy systems used in this temperature range were cobalt- or nickel-based, it was quite adequate to braze these alloys with compatible cobalt- or nickel-based brazing alloys. However, the use of cobalt- or nickel-based systems to braze an iron-based alloy for use at such elevated temperatures would likely result in Kirkendall porosity during service and loss of physical properties in the brazement.

INCOLOY alloy MA 956 is an oxide-dispersion-strengthened, iron-chromium-aluminum alloy produced by mechanical alloying. The nominal chemical composition is shown in Table I. The alloy is strengthened by a yttrium oxide dispersoid that remains stable at temperatures up to the high melting point of the material. The alloy combines strength at high temperatures with excellent resistance to oxidation, carburization, and hot corrosion. Accordingly, these attributes make it an especially suitable material for gas-turbine combustion chambers, components of advanced energy-conversion systems, and other applications involving rigorous service conditions.

TABLE I

NOMINAL CHEMICAL COMPOSITION OF INCOLOY* ALLOY MA 956 (Wt. %)

| Iron | 74 |
|---|---|
| Chromium | 20 |
| Aluminum | 4.5 |
| Titanium | 0.5 |
| Yttrium Oxide(Y$_2$O$_3$) | 0.5 |

Clearly, a brazing alloy compatible with iron-based alloy systems is desirable and necessary.

SUMMARY OF THE INVENTION

Accordingly, there is provided a brazing alloy useful for brazing iron-based alloys. The new alloy provides a brazement of matching composition to the iron-based alloy. The brazing alloy exhibits high temperature corrosion resistance and high stress rupture strength characteristics similar to the underlying alloy systems. The invention, useful at temperatures of at least 982° C. (1800° F.), contains little or no boron and has similar ductility characteristics to the base metal.

The brazing alloy broadly comprises (in weight percent):

| Cr | 19-30 |
|---|---|
| Ni | 0-25 |
| Mn | 0.6-30 |
| Si | 0-7 |
| B | 0-2 |
| C | 0-0.3 |
| Al | 0-10 |
| Fe | Balance |

PREFERRED MODE FOR CARRYING OUT THE INVENTION

As was discussed heretofore, the iron-based alloy INCOLOY* alloy MA 956 is intended for applications involving extremes of heat and corrosion. For maximum utility, the alloy must be capable of being joined by welding or brazing for use in conditions where previously no weld or braze has been successfully employed. To date none of the commercially available brazing alloys have been successful in joining MA 956 for service at or above 982° C. (1800° F.).
* Trademark of the Inco family of companies.

In addition to inadequate stress rupture life, porosity was also found in all of the brazements made with existing brazing alloys. The porosity in the MA 956 appears to be due to the Kirkendall effect, since all of the commercial alloys are Ni- or Co-based with additions of W, Ti, and Mo. The instant iron-based alloy reduces the likelihood or severity of Kirkendall porosity. Additionally, most commercial brazing alloys use boron as a primary melting point depressant. Boron in this situation is undesirable in that it diffuses into the MA 956 forming brittle phases. The instant alloy, by the substitution of manganese for boron, substantially eliminates the need for boron and the problems caused thereby.

A number of initial heats incorporating the contemplated ranges were atomized. After atomization samples were taken for thermal analysis to determine the liquidus and solidus of each composition. When the liquidus temperature was determined to be below 1320° C. (2410° F.), a braze of MA 956 was made with the experimental brazing alloy and a stress rupture test was carried out along with a metallographic evaluation of the brazement. The stress rupture specimens were made from vacuum brazed (10$^{-6}$ torr) "tuning fork" type brazements. A number of compositions of the alloy are listed in Table II.

TABLE II

ALLOY COMPOSITIONS FOR BRAZING WITH LIQUIDUS TEMPERATURES BELOW 1320° C. (2400° F.)

| Heat No. | Fe | Cr | Ni | Mn | Si | B | C | Al | Liquidus Temp. °C. | (°F.) |
|---|---|---|---|---|---|---|---|---|---|---|
| 86552 | Bal | 19 | 12 | .6 | 2.5 | 1.0 | .1 | — | 1230 | (2246) |
| 86553 | " | 25 | 25 | 2.5 | 3.0 | 1.5 | .15 | — | 1162 | (2123) |
| 86554 | " | 20 | 7.5 | 20 | 2.5 | 1.0 | .1 | — | 1271 | (2320) |
| 86558 | " | 25 | 7.0 | 20 | 2.5 | 1.5 | .1 | .5 | 1258 | (2296) |
| 86563 | " | 25 | — | 10 | 2.5 | 2.0 | .1 | 1.0 | 1290 | (2355) |
| 86565 | " | 25 | — | 10 | 2.5 | 1.0 | .1 | — | 1302 | (2375) |
| 86593 | " | 25 | — | 20 | 2.5 | 2.0 | — | 5.0 | 1310 | (2390) |
| 86610 | " | 25 | 10 | 10 | 2.5 | 1.0 | .1 | 5.0 | 1302 | (2375) |
| 86611 | " | 25 | — | 10 | 2.5 | 1.0 | .1 | 5.0 | 1315 | (2400) |

The heats in Table II were remelted in a 10$^{-6}$ torr vacuum to simulate a brazing cycle. The resulting ingots were then sectioned and evaluated metallographically for structure and chemically using an electron microprobe. T-86558 resulted in a three phase microstructure, while T-86593 resulted in a two-phase structure.

The matrix of T-86593 is essentially the same as the composition of MA 956, while the matrix of T-86558 is basically Fe-20Cr. In both melts the second phase is chromium boride (CrB) with the total exclusion of several elements.

A number of the heats listed in Table II were used to produce MA 956 brazements. The resulting brazements displayed satisfactory appearances and were successfully stress-rupture tested at 982° C. (1800° F.). Stress-rupture testing of some heats at 1092° C. (2000° F.) produced disappointing results. See Table III.

TABLE III

STRESS RUPTURE RESULTS

| Heat No. | MPa(ksi) | (Hours) | Temperature °C. | (°F.) |
|---|---|---|---|---|
| T-86558 | 13.8/20.7/27.6/34.5 (2)/(3)/(4)/(5) | 24/24/24/1000+ | 982 | (1800) |
| T-86558 | 13.8/20.7/27.6 (2)/(3)/(4) | 24/24/2.1 | 1092 | (2000) |
| T-86611 | 13.8/20.7/27.6/34.5 (2)/(3)/(4)/(5) | 24/24/24/581.9 | 982 | (1800) |
| T-86565 | 13.8/20.7/27.6/34.5 (2)/(3)/(4)/(5) | 24/24/24/39.6 | 1092 | (2000) |

Table III contains the results of stress-rupture testing at 982° C. (1800° F.) and 1092° C. (2000° F.). T-86558 produced good as-brazed stress-rupture properties at 982° C. (1800° F.); however, at 1092° C. (2000° F.) the brazing alloy failed in stress-rupture testing not due to overloading but due to oxidation or nitridation. Accordingly, increased levels of aluminum, and silicon would tend to reduce these undesirable processes.

In order to enhance the high temperature rupture characteristics of the brazing alloy, and in view of the results listed in Table III, additional amounts of manganese, silicon, carbon and aluminum were added to subsequent heats. Increased amounts of aluminum will protect the alloy from carburization, nitridation and oxidation. Nickel imparts toughness and can maintain the austenitic nature of the alloy. Silicon, manganese and carbon act as melting point depressants.

Indeed for higher temperature applications (in excess of 982° C. [1800° F.]), the following alloy (in weight percent) is preferred:

| Chrome | 20–25% |
|---|---|
| Ni | 0–10 |
| Mn | 10–30 |
| Si | 0–7 |
| C | 0–0.3 |
| Al | 0–10 |
| Fe | Balance |

Typically, the melting point depressants used in existing brazing alloys are boron, silicon, and phosphorous. It has been determined, however, that significant quantities of boron are undesirable in an iron-based brazing alloy. Boron if used as a primary melting point depressant would diffuse into the base metal. Although it will raise the remelt temperature of the brazing alloy (a desirable feature), the boron will form brittle, discrete second phase chromium borides (CrB) in the base metal. Boron is an interstitial; nesting between the atoms in the lattice. Since it possesses a relatively small diameter, the boron will quickly diffuse into the lattice. As it does so, it forms the brittle CrB second phase in the base metal. CrB will tend to degrate the integrity of the brazement.

However, it has been determined that in iron-based systems manganese operates in a dual fashion. Firstly, the manganese acts as a melting point depressant and is therefore an excellent substitute for boron. The use of 10–30 percent manganese in the iron-based system, in conjunction with silicon and carbon, is sufficient to depress the liquidus of the alloy below 1320° C. (2410° F.). Secondly, most of the manganese vaporizes during the brazing cycle. This phenomenon allows the brazing alloy's remelt temperature to increase without the undesirable tendency to form second phases such as chromium borides (CrB) in the base metal as in the case of boron.

It can be appreciated that an object of the invention is therefore to reduce or eliminate the boron level in the brazement. However, a small quantity of boron may be present in the initial alloy (i.e., before brazing) in order to reduce the melting point of the alloy.

A microprobe analysis of a brazement of MA 956 revealed that, when brazing in a vacuum with the manganese containing alloys in thin layers (large surface area to volume ratio), the manganese totally evaporates from the brazing alloy. This effectively increases the relative amounts of iron and chromium and any other non-volatile alloying elements used in the brazing alloy. Simultaneously the loss of manganese, by altering the relative proportions of the remaining elements, greatly increases the remelt temperature of the brazement.

Another aspect of the CrB formation problem that should be considered is the possibility of a reduction in the available chromium content in solution in the iron to a level that would prevent passivation of the brazing alloy. This would be similar to sensitization of stainless steel by chromium carbide precipitation. It is also possible that if an iron-based brazing alloy did not contain chromium but did contain boron, then the boron could cause a sensitization type reaction in the MA 956.

The boron in the CrB phase appears to be easily replaced by nitrogen or oxygen at elevated temperatures; therefore, this phase is preferentially attacked. This preferential corrosion of the CrB phase is another good reason to avoid using boron in brazing alloys for use with MA 956 at elevated temperatures. As mentioned before, the undesirable CrB phase forms in the matrix of the MA 956 during the brazing cycle and during exposure to elevated temperature.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A chromium-nickel-manganese-iron alloy, the alloy especially useful for brazing iron-based alloys and exhibiting high-temperature corrosion resistance and stress rupture strength, the alloy consisting essentially of (in weight %) about 19–25% chromium, up to about 15% nickel, about 15–25% manganese, up to about 3% silicon, up to about 1.5% boron, up to about 0.3% carbon, up to about 5% aluminum and the balance iron.

2. The alloy according to claim 1 wherein most of the manganese vaporizes upon brazing the alloy to an article of manufacture.

3. The alloy according to claim 1 wherein the melting point of the alloy before brazing is lower than the melting point of the alloy after brazing.

* * * * *